Patented Mar. 8, 1949

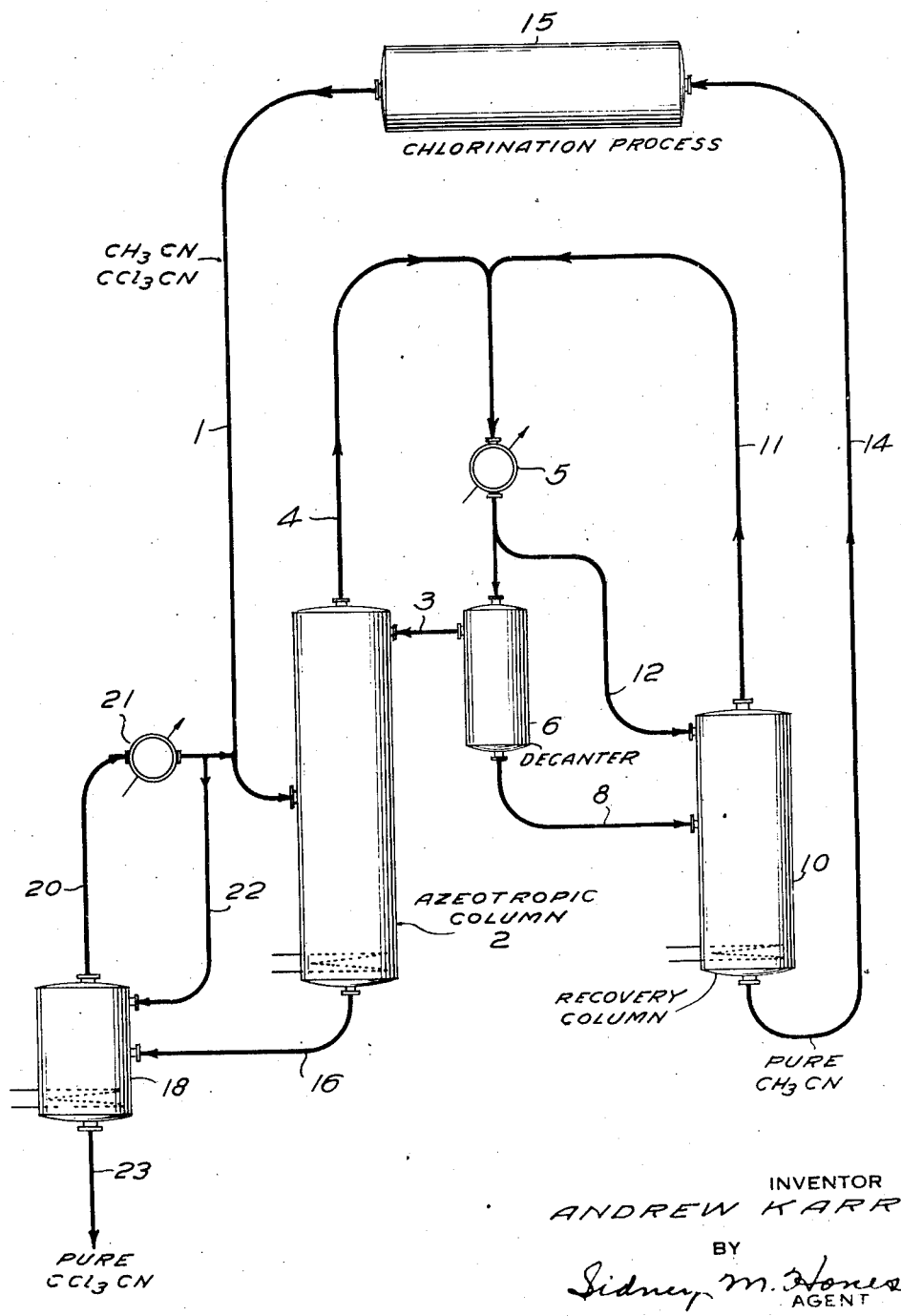

2,463,629

UNITED STATES PATENT OFFICE 2,463,629

AZEOTROPIC DISTILLATION OF ACETONITRILE-TRICHLORACETONITRILE MIXTURES

Andrew Karr, Brooklyn, N. Y., assignor to American Cyanamid Company, New York, N. Y., a corporation of Maine Application October 30, 1946, Serial No. 706,783

7 Claims. (Cl. 202—42)

The present invention relates to the separation of mixtures of acetonitrile and trichloracetonitrile and more particularly to such separation by means of a distillation process.

It is an object of the present invention to separate a mixture of acetonitrile and trichloracetonitrile into the two individual constituents by a process requiring only very simple apparatus and procedures whereby the two components may be separated efficiently and provided in a high degree of purity.

Other objects of the present invention will be apparent from the discussion that follows hereinafter.

In the chlorination of acetonitrile to obtain trichloracetonitrile, which has pronounced insecticidal properties, the separation of acetonitrile from trichloracetonitrile has in the past been effected only with great difficulty. Attempts to separate these two materials by ordinary processes of distillation are ineffectual because of their similar boiling points and the further fact that the two materials form a minimum boiling homogeneous azeotropic mixture containing 71% of the desired trichloracetonitrile and 29% of acetonitrile, the starting material. In the past, these two materials have been separated by procedures involving a combination of extraction and distillation. The acetonitrile was extracted with water and the trichloracetonitrile had to be dried before subsequent distillation. Also, in recovering the acetonitrile for use in subsequent chlorination, it was necessary that it be thoroughly dried or side reactions resulting in the formation of trichloracetamide would occur during such chlorination.

It has now been found that by distilling a mixture of acetonitrile and trichloracetonitrile with paraffinic hydrocarbon having a boiling point or a boiling range below a temperature of substantially 115° C. the acetonitrile and trichloracetonitrile may be separated from each other. On fractionating the three component mixture a heterogeneous constant boiling mixture, hereinafter called a CBM, of the paraffinic hydrocarbon and the acetonitrile is separated from the trichloracetonitrile. On condensation of said CBM the two components separate into two phases which are substantially insoluble in each other. Separation of the two phases provides the acetonitrile for use as the starting material in subsequent chlorination. Distillation is continued until all of the acetonitrile has been brought over and thereafter the residue of trichloracetonitrile and any remaining paraffinic hydrocarbon are fractionated in the usual manner.

The invention is further described and its operation set forth in greater detail in connection with the attached drawing.

As aforementioned, any paraffinic hydrocarbon or mixture thereof boiling below a temperature of substantially 115° C. at atmospheric pressure may be employed in the practice of the present invention. Such paraffinic hydrocarbons include the open-chain or aliphatic paraffins, the cyclo paraffins, hydrocarbon substituted cyclo paraffins and like saturated hydrocarbons. While any of such above-mentioned paraffins may be employed in the practice of the present invention, it is preferred to use such of those as have a boiling point or a boiling range within the temperature range of substantially 35°–115° C. since the use of such permits carrying out the process of the invention at atmospheric pressure in a practical manner with regard to, for example, the condensation of the heterogeneous CBM and the thermal efficiency of the acetonitrile separation as explained more fully hereinafter. When paraffins boiling substantially below 35° C. at atmospheric pressure are employed the use of superatmospheric pressures are generally required in connection with the fractionation. The selection of a paraffin and/or a pressure of fractionation such that the paraffin would boil at a temperature substantially below 35° C. is not practical because of the low boiling point of the resulting paraffin-acetonitrile CBM and the attendant difficulty in condensing such a low boiling mixture, and because of the thermal inefficiency of the acetronitrile separation under such conditions.

As illustrative of the effect of the boiling point of the paraffin on the thermal efficiency with which the acetonitrile is separated, the use of n-pentane at atmospheric pressure in the process of the present invention results in a distillate containing only about 10% acetonitrile on a weight basis while the use of n-hexane provides a similar CBM containing of the order of 25% acetonitrile, n-heptane provides a CBM containing of the order of 40% and the use of 2-methyl-3-ethyl pentane provides an azeotrope containing of the order of 55% acetonitrile. Thus, the use of paraffinic hydrocarbons boiling substantially below 35° C. at atmospheric pressure, while within the contemplated scope of the present invention, is not preferred because such use mainly involves the distillation of the hydrocarbon and such amounts of acetonitrile as are too small to be of very practical benefit. On the other hand, the use of paraffins boiling at temperatures appreciably above 115° C. at atmospheric pressure results in a CBM boiling too close to the boiling point of the aforementioned homogeneous acetonitrile-trichloracetonitrile azeotrope, so that difficulty in fractionating the paraffin-acetonitrile CBM from the acetonitrile-trichloracetonitrile azeotrope is encountered. The heterogeneous CBM resulting from the use of 2-methyl-3-ethyl pentane (boiling point 114° C.) in the process of the present invention boils at about 65° C. whereas the boiling point of the acetonitrile-trichloracetonitrile azeotrope is 75.6° C. at atmospheric pressure.

As aforementioned, even those paraffins which are gaseous under ordinary conditions of temperature and pressure may be employed in the process of the present invention provided that the fractionation is carried out under sufficiently high pressures. For example, using n-propane which has a boiling point of −42.3° C. at atmospheric pressure, the use of an absolute pressure of about 280 lbs./sq. in. results in obtaining a propane-acetonitrile CBM boiling at 55° C. and containing about 2.2% acetonitrile on fractionation. While the use of such high pressures and the fact that such a small percentage of the desired acetonitrile is present in the CBM obtained are somewhat disadvantageous, on the other hand, there is advantage in the use of such a low boiling paraffin in that the fractionation problem is greatly facilitated and a simpler and more inexpensive column can be employed. Similarly, the use of higher pressures with higher boiling paraffins such as those boiling within the aforementioned preferred range of substantially 35°–115° C. offers certain advantages with respect to increased thermal efficiency of acetonitrile separation and greater ease of condensing the heterogeneous CBM.

The use of paraffins boiling outside the range of 75°–95° C. is preferred because of the greater ease of subsequently separating any excess of such paraffins from the trichloracetonitrile after the acetonitrile has been removed from the mixture in the form of the heterogenous CBM. The use of paraffins boiling within this range necessitates careful control of the amount in which they are employed so that their removal from the system in the form of the heterogeneous CBM will be complete. This practically necessitates the use of a less efficient stillhead arrangement in which the reflux is the paraffin-acetonitrile CBM instead of the more efficient stillhead described hereinafter which provides the paraffin as reflux. Paraffins boiling within the range of 35°–75° C. are preferred because of greater ease in separating the heterogeneous CBM and in subsequently separating the paraffin from the trichloracetonitrile. Paraffins boiling within the range of 95°–115° C. while less volatile than trichloracetonitrile, nevertheless, form an azeotrope with acetonitrile which is more volatile than the homogeneous acetonitrile-trichloracetonitrile azeotrope and there is no difficulty with the subsequent separation of the trichloracetonitrile from such paraffins.

While the present invention contemplates the use of mixtures of paraffin hydrocarbons as well as the relatively pure hydrocarbons, the use of mixtures having wide boiling ranges is best avoided. The use of such mixtures results in obtaining all the disadvantages attendant upon the use of each particular hydrocarbon present in the mixture with none of the corresponding advantages. For example, with a mixture of paraffinic hydrocarbons boiling over a range of 35°–75° C., the thermal efficiency of acetonitrile distillation would be reduced, as explained hereinabove, because of the presence of the low-boilers, and the subsequent separation of the trichloracetonitrile from any excess hydrocarbon would be difficult because of the presence of the high-boilers. Accordingly, it is preferred to employ paraffin mixtures boiling over as narrow a range as possible, a pure paraffin being preferred, although mixtures boiling over a 10° C. range, such as commercial hexane, which are readily available from the petroleum industry offer no real operational difficulties when used in the practice of the present invention.

The process of the present invention may be practiced as a batch process or as a continuous process. The following example in which parts are by volume is given as illustrative of the procedure involved when the process of the invention is employed in a batch operation: A stillpot was charged with 50 parts of trichloracetonitrile, 38 parts of acetonitrile and 35 parts of commercial hexane (boiling range 60°–70° C.), and connected to a fractionating column of ½ in. I. D., being 54 in. high, insulated with an evacuated, silvered jacket and packed with ⅛ in. glass helices. This column provided about 20 theoretical plates. At the top of the column was an inverted U-bend leading to a total condenser below which was a decanter. The decanter was of the conventional type equipped with an overflow tube near the top and a drain tube at the bottom similar to the one shown at 6 in the attached drawing. The decanter was primed with 10 parts by volume of commercial hexane so that reflux could be provided from the very start of the distillation. As the heterogeneous CBM was distilled and collected in the decanter the acetonitrile and paraffin phases separated, the former being the lower phase. The paraffin was withdrawn from the decanter through the aforementioned overflow tube and introduced back into the fractionating column near the top to serve as reflux. This stillhead arrangement is more efficient with a heterogeneous CBM than a more conventional stillhead which would reflux the heterogeneous mixture rather than just the hexane. The distillation was then begun and allowed to continue until the acetonitrile no longer came over. In this manner 42.9 parts by volume of hexane-contaminated acetonitrile having a refractive index of 1.3439 as compared with a refractive index of 1.3419 for the starting material was obtained. The total condenser and decanter device was then replaced by a conventional type of stillhead and reflux splitter suitable for use in the fractionation of homogeneous mixtures. Using this apparatus at a reflux ratio of 5 the hexane was brought over until a temperature of 85° C. obtained in the stillhead. The amount of hexane fractionated was 39.8 parts by volume. Distillation was then stopped and the residue of trichloracetonitrile, correcting for non-drainable holdup, was 47 parts. This amounted to a recovery of 94% of water white trichloracetonitrile having a refractive index of 1.4378 (the refractive index of the starting material was 1.4375).

The acetonitrile fraction may then be fractionated to remove, as the heterogeneous hexane-acetonitrile CBM, the hexane contained therein using any conventional stillhead and reflux splitter and the thus purified acetonitrile is ready for use in a subsequent chlorination. Also, if desired, the trichloracetonitrile may be distilled to obtain an even purer product, although as indicated above the process provides trichloracetonitrile of a very high degree of purity.

As aforementioned, the process may also be operated continuously and the attached drawing shows an arrangement suitable for carrying out the process in such a manner. The acetonitrile-trichloracetonitrile mixture resulting from the chlorination of acetonitrile is introduced by feed line 1 into fractionating column 2. The necessary reflux is provided by introducing, say, commercial hexane at the top of fractionating column 2 by line 3. The acetonitrile-hexane CBM is removed through line 4 as the "overhead" from fractionating column 2, said overhead being condensed in condenser 5 and collected in decanter 6 where the hexane-acetonitrile CBM separates into two phases. The upper hexane phase supplies the aforementioned reflux line 3, it being preferable to prime the decanter with hexane or a mixture of hexane and acetonitrile so as to provide the entrainer from the very start of the fractionation. The lower phase of acetonitrile is withdrawn from the decanter through line 8 and introduced into fractionating column 10 whereby any dissolved and/or mechanically held hexane is removed, in the form of the heterogeneous CBM, as overhead through line 11 being condensed in aforementioned condenser 5 and collected in the decanter, reflux being provided to the column by the diversion of condensed CBM through line 12. The pure acetonitrile is removed from the fractionating column 10 as "foots" and is sent by line 14 to chlorination operation 15.

The trichloracetonitrile is removed from fractionating column 2 as foots through line 16 and introduced into fractionating column 18 for fractionation away from any contaminating hexane. The small proportion of hexane removed as overhead from this fractionation is removed through line 20, condensed in condenser 21 and introduced into feed line 1, the amount required to serve as reflux for fractionating column 18 being returned to column 18 by line 22. Pure trichloracetonitrile is obtained as foots from column 18 through line 23.

While the process of the present invention has been described with reference to specific embodiments it is not to be considered as limited thereby but should be construed solely in accordance with the scope of the appended claims.

What is claimed is:

1. A method of separating a mixture of acetonitrile and trichloracetonitrile comprising distilling said mixture with paraffinic hydrocarbon boiling below substantially 115° C.

2. A method of separating a mixture of acetonitrile and trichloracetonitrile comprising distilling said mixture with paraffinic hydrocarbon boiling within the range of substantially 35°–115° C.

3. A method of separating a mixture of acetonitrile and trichloracetonitrile comprising distilling said mixture with paraffinic hydrocarbon boiling within the range of substantially 50°–75° C.

4. A method of separating a mixture of acetonitrile and trichloracetonitrile comprising distilling said mixture with paraffinic hydrocarbon boiling over a 10° C. range within the range of substantially 35°–115° C.

5. A method of separating a mixture of acetonitrile and trichloracetonitrile comprising distilling said mixture with paraffinic hydrocarbon boiling over a 10° C. range within the range of substantially 50°–75° C.

6. A method of separating a mixture of acetonitrile and trichloracetonitrile comprising distilling said mixture with paraffinic hydrocarbon boiling within the range of substantially 60°–70° C.

7. A method of separating a mixture of acetonitrile and trichloracetonitrile comprising distilling said mixture with a substantially pure hexane.

ANDREW KARR.

REFERENCES CITED

The following references are of record in the file of this patent:

UNITED STATES PATENTS

| Number | Name | Date |
| --- | --- | --- |
| 2,388,506 | Teter | Nov. 6, 1945 |
| 2,411,346 | Teter | Nov. 19, 1946 |
| 2,415,662 | Teter | Feb. 11, 1947 |